United States Patent
Masaki et al.

(10) Patent No.: US 12,296,269 B2
(45) Date of Patent: May 13, 2025

(54) SYSTEMS OF METHODS OF RENDERING TEXTURES IN VIRTUAL SPACES WITH WALLS AND ARRANGEABLE OBJECTS

(71) Applicant: Nintendo Co., Ltd., Kyoto (JP)

(72) Inventors: Yoshifumi Masaki, Kyoto (JP); Mayu Furukawa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 277 days.

(21) Appl. No.: 17/896,606

(22) Filed: Aug. 26, 2022

(65) Prior Publication Data

US 2023/0092465 A1 Mar. 23, 2023

(30) Foreign Application Priority Data

Sep. 22, 2021 (JP) ................. 2021-154344

(51) Int. Cl.
*A63F 13/63* (2014.01)
*A63F 13/52* (2014.01)
*G06T 15/04* (2011.01)

(52) U.S. Cl.
CPC .............. *A63F 13/63* (2014.09); *A63F 13/52* (2014.09); *G06T 15/04* (2013.01); *A63F 2300/6018* (2013.01)

(58) Field of Classification Search
None
See application file for complete search history.

(56) References Cited

FOREIGN PATENT DOCUMENTS

JP 2005-141638 6/2005

OTHER PUBLICATIONS

"Home Design 3D—TUTO 1 Start With Home Design 3d", [year 2019]. [online], [retrieved Sep. 20, 2024]. Retrieved from the Internet <URL:https://www.youtube.com/watch?v=Rhul262CmOs>. 1 page.*
"Home Design 3D—TUTO 2 Edit Rooms and Walls", [year 2017]. [online], [retrieved Sep. 20, 2024]. Retrieved from the Internet < URL: https://www.youtube.com/watch?v=owdrA_z1Z5Q>. 1 page.*
"Home Design 3D—TUTO 3 Add Doors and Windows", [year 2017]. [online], [retrieved Sep. 20, 2024]. Retrieved from the Internet <URL: https://www.youtube.com/watch?v=pRSzQAqtRak>. 1 page.*
"Home Design 3D—TUTO 7 Apply Textures in your Project", [year 2017]. [online], [retrieved Sep. 20, 2024]. Retrieved from the Internet <URL: https://www.youtube.com/watch?v=xYZc8DOuXgg>. 1 page.*
"Home Design 3D—TUTO 17 Create indoor balconies", [year 2018]. [online], [retrieved Sep. 20, 2024]. Retrieved from the Internet <URL: https://www.youtube.com/watch?v=CJ6Vkw5uLqE>. 1 page.*
Feb. 21, 2023 Office Action issued in Japanese Patent Application No. 2021-154344 [machine translation included] pp. 1-2.
https://pino-blog.com/259-2/ ; "How to remove the wallpaper and return to the initial state," pp. 1-16.

(Continued)

*Primary Examiner* — Lawrence S Galka
(74) *Attorney, Agent, or Firm* — Nixon & Vanderhye P.C.

(57) ABSTRACT

On the basis of operation data, a wallpaper to be set on a wall object constructing a wall of a room is selected. Then, in a rendering process, a process of rendering the wall object and a first-type object arranged in the room by using a wallpaper texture corresponding to the set wallpaper, and a process of rendering a second-type object arranged in the room, are executed.

19 Claims, 14 Drawing Sheets

(56) References Cited

OTHER PUBLICATIONS https://ameblo.jp/orange-dragon/entry-12652646670.html ; Shinzi Katoh, "Redecorating (6) Wallpaper," pp. 1-9.
"Carefree Island Days Arrange Your Home", Nintendo Co., Ltd., retrieved Aug. 26, 2021, 9 pages (with Partial Translation), https://www.nintendo.co.jp/switch/acbaa/guide/index.html.

* cited by examiner

| OBJECT ID (341) | TYPE DATA (342) | MODEL DATA (343) | OBJECT TEXTURE DATA (344) |
|---|---|---|---|
| 001 | SECOND TYPE | ... | ... |
| 002 | SECOND TYPE | ... | ... |
| 003 | FIRST TYPE | ... | NONE |

304

| WALLPAPER ID (351) | WALLPAPER TEXTURE DATA (352) |
|---|---|
| 001 | ... |
| 002 | ... |
| 003 | ... |

305

307
371 ROOM SIZE DATA
372 SET WALLPAPER DATA
373 ARRANGEMENT POSITION DATA

SYSTEMS OF METHODS OF RENDERING TEXTURES IN VIRTUAL SPACES WITH WALLS AND ARRANGEABLE OBJECTS

CROSS REFERENCE TO RELATED APPLICATION

This application claims priority to Japanese Patent Application No. 2021-154344 filed on Sep. 22, 2021, the entire contents of which are incorporated herein by reference.

FIELD

The present disclosure relates to game processing in which a user can change the layout, pattern, and decoration of a room in a virtual game space.

BACKGROUND AND SUMMARY

Heretofore, a game in which a user can arrange a furniture object or the like in a virtual room constructed in a virtual game space to perform layout change or redecoration of the room, has been known.

In the above game, the user can customize the room by arranging furniture in the room or putting wallpaper on a wall.

In the above game, however, an object, such as a partitioning wall, for partitioning the inside of the room has not been used. In this regard, it is conceivable to partition the inside of the room by using furniture objects such as a desk and a sofa, for example. However, the original use of such furniture objects is not partitioning a room, and the pattern of the wallpaper does not match the appearances of the furniture objects. Therefore, it difficult to neatly partition the room. Moreover, arranging the furniture objects such as a partition takes time in operation.

Therefore, an object of the present disclosure is to provide a computer-readable non-transitory storage medium having a game program stored therein, a game system, a game apparatus, and a game processing method which are capable of partitioning a room while maintaining a sense of unity with respect to the atmosphere of the room, through a simple operation.

In order to attain the object described above, for example, the following configuration examples are exemplified.

A configuration example is directed to a computer-readable non-transitory storage medium having stored therein a game program causing a computer of an information processing apparatus to execute an operation data acquisition process, a wall object arrangement process, an object operation process, a wallpaper selection process, and a rendering process. Examples of the computer-readable non-transitory storage medium include: magnetic media such as a flash memory, a ROM, and a RAM; and optical media such as a CD-ROM, a DVD-ROM, and a DVD-RAM. In the operation data acquisition process, the computer acquires operation data on the basis of an operation input. In the wall object arrangement process, the computer arranges a wall object constructing a wall of a room in a virtual space. In the object operation process, the computer, on the basis of the operation data, selects an object from among a plurality of objects including a first-type object and a second-type object, and arranges, moves, or deletes the selected object in the room. In the wallpaper selection process, the computer, on the basis of the operation data, selects wallpaper to be set on the wall object. The rendering process includes at least a wall object rendering process of rendering the wall object by using a wallpaper texture corresponding to the set wallpaper, a first object rendering process of rendering the first-type object arranged in the room, by using the wallpaper texture corresponding to the set wallpaper, and a second object rendering process of rendering the second-type object arranged in the room.

According to the above configuration example, the same wallpaper texture can be set for the wall object and the first-type object through a wallpaper setting operation performed on the wall object. Thus, the room can be partitioned while maintaining a sense of unity with respect to the atmosphere of the room, through a simple operation, whereby convenience of the user can be improved.

In another configuration example, in the object operation process, the game program may cause the computer to, on the basis of the operation data, select an object from among the plurality of objects including the first-type object and the second-type object, and arrange, move, or delete the object on a floor object constructing a floor of the room.

According to the above configuration example, the object can be arranged on the floor of the room. After the arrangement, the arrangement position and orientation of the object can be changed, and the object can be deleted. Thus, the degree of freedom in customizing the room can be improved.

In another configuration example, the first-type object may have a main surface. In the first-type object rendering process, the game program may cause the computer to render the main surface of the first-type object by using the wallpaper texture corresponding to the set wallpaper.

According to the above configuration example, the wallpaper can be applied to the main surface having a wide area in the first-type object, thereby effectively improving the sense of unity of the room.

In another configuration example, the main surface of the first-type object may have a rectangular shape.

In another configuration example, in the object operation process, the game program may cause the computer to arrange the wall object such that at least one of main surfaces of the wall object is along a first direction in the virtual space, and arrange or move the first-type object such that the main surface of the first-type object is along the first direction or a second direction perpendicular to the first direction.

In another configuration example, in the wall object rendering process, the game program may cause the computer to render the wall object such that a plurality of wallpaper textures identical to the wallpaper texture used for rendering of the main surface of the first-type object are arranged side by side on a wall surface of the wall object.

According to the above configuration example, a plurality of wallpaper textures of the same image which are arranged side by side can be used as wallpaper, thereby further improving the sense of unity of the room.

In another configuration example, the first-type object may have a height, in the virtual space, which is equal to the height of the wall object.

According to the above configuration example, the inside of the room can be partitioned into a plurality of areas by using the first-type object having the same height as the wall object. This allows the user to enjoy a room layout which is free from incompatibility in appearance while improving independence of each partitioned room.

In another configuration example, the first-type object may have two main surfaces that are parallel to each other and facing outward from each other. In the first-type object rendering process, the game program may cause the computer to render the two main surfaces by using the wallpaper texture corresponding to the set wallpaper.

According to the above configuration example, a sense of unity can be achieved over the entire room while partitioning the inside of the room into a plurality of areas.

In another configuration example, in the first-type object rendering process, the game program may cause the computer to calculate a color based on a color of any pixel in the wallpaper texture used for the main surface, and render a side surface, of the first-type object, which is different from the main surface of the first-type object, by using an image consisting of the calculated color.

According to the above configuration example, an image having less incompatibility also for the side surface of the first-type object can be obtained. Thus, the sense of unity with respect to the atmosphere of the entire room can be prevented from being deteriorated.

In another configuration example, in the wallpaper selection process, the game program may cause the computer to present, as wallpaper to be set on the wall object, two types of wallpapers including a still-picture wallpaper and an animation wallpaper in which a predetermined animation is reproduced, such that a user can select one of the two types of wallpapers. The animation may include an image that is temporarily displayed at a predetermined timing. When the animation wallpaper has been selected, in the wall object rendering process and the first-type object rendering process, an area obtained by combining the main surface of the wall object and the main surface of the first-type object may be regarded as one display target area, and the game program may cause the computer to determine a predetermined position in the display target area as a display position of the image that is temporarily displayed.

According to the above configuration example, for example, when the animation wallpaper is used, the display position of the predetermined image can be determined by using all the main surfaces of the wall object and the first-type object. This provides an animation effect having a sense of unity with respect to the display position of the predetermined image.

According to the present disclosure, convenience of the user can be improved when the user creates and edits a room having a sense of unity.

DETAILED DESCRIPTION OF NON-LIMITING EXAMPLE EMBODIMENTS

Hereinafter, one exemplary embodiment will be described. It is to be understood that, as used herein, elements and the like written in a singular form with the word "a" or "an" attached before them do not exclude those in the plural form.

[Hardware Configuration of Information Processing Apparatus]

First, an information processing apparatus for executing information processing according to the exemplary embodiment will be described. The information processing apparatus is, for example, a smartphone, a stationary or handheld game apparatus, a tablet terminal, a mobile phone, a personal computer, a wearable terminal, or the like. The information processing according to the exemplary embodiment can also be applied to a game system including a game apparatus, etc., as described above, and a predetermined server. In the exemplary embodiment, a stationary game apparatus (hereinafter, referred to simply as "game apparatus") is described as an example of the information processing apparatus.

Figure 1:
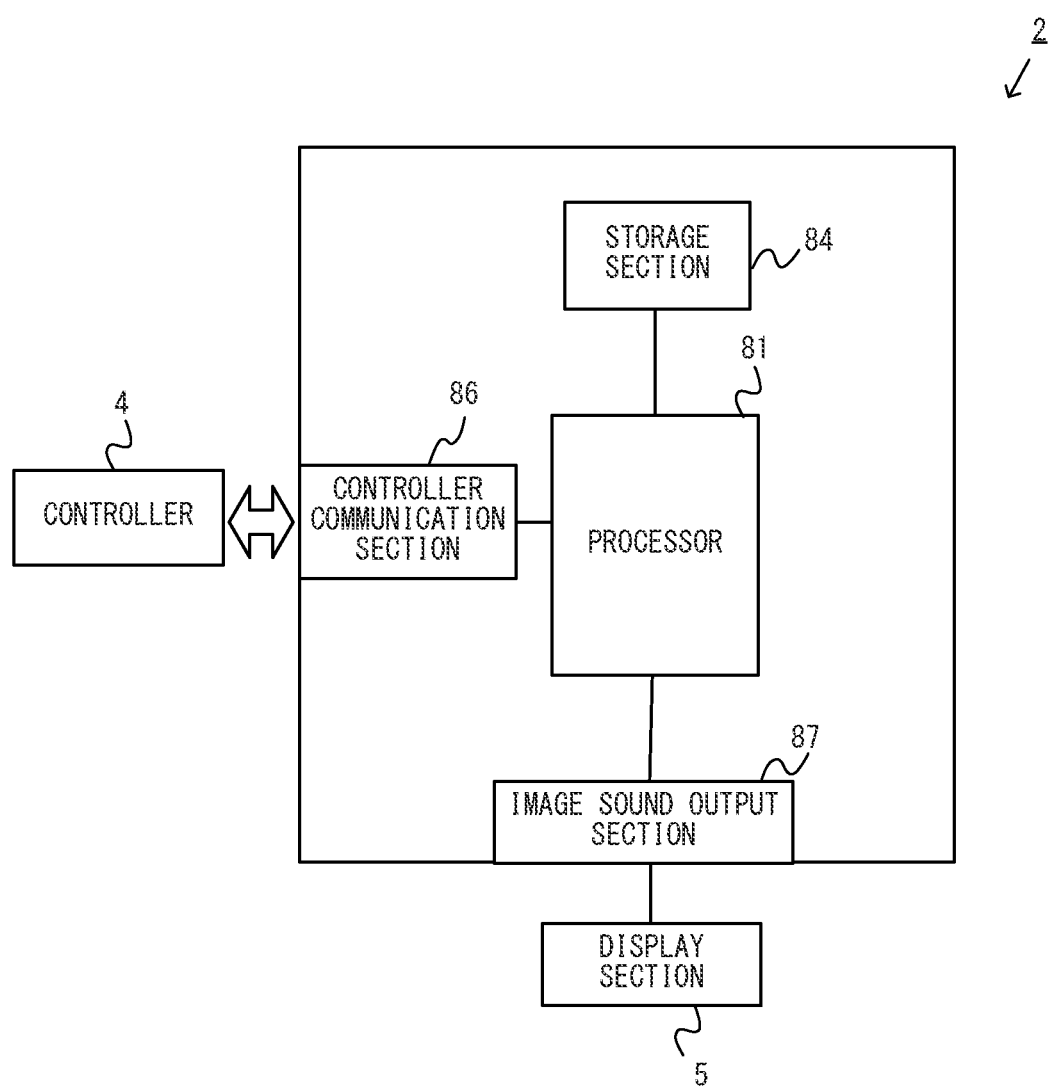
FIG. 1 is a block diagram showing a non-limiting example of an internal configuration of a game apparatus 2.

FIG. 1 is a block diagram showing an example of the internal configuration of a game apparatus 2 according to the exemplary embodiment. The game apparatus 2 includes a processor 81. The processor 81 is an information processing section for executing various types of information processing to be executed by the game apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 performs various types of information processing by executing an information processing program (e.g., a game program) stored in a storage section 84. The storage section 84 may be, for example, an internal storage medium such as a flash memory or a DRAM (Dynamic Random Access Memory), or may be configured to utilize an external storage medium mounted to a slot that is not shown, or the like.

Furthermore, the game apparatus 2 includes a controller communication section 86 for allowing the game apparatus 2 to perform wired or wireless communication with a controller 4. Although not shown, the controller 4 is provided with various kinds of buttons such as a cross key and ABXY buttons, an analog stick, and the like.

A display section 5 (e.g., a television) is connected to the game apparatus 2 via an image sound output section 87. The processor 81 outputs images and sounds generated (by executing the aforementioned information processing, for example), to the display section 5 via the image sound output section 87.

[Outline of Game Processing of the Exemplary Embodiment]

Next, an outline of operation of game processing executed by the game apparatus 2 according to the exemplary embodiment will be described. In this game processing, a user arranges, in a predetermined area in a virtual space, an arrangement item which is a kind of an in-game object and has been obtained by the user in the game. Specifically, the predetermined area is a room of a player character object (hereinafter, referred to simply as "player character"). The arrangement item is a virtual object with which the room is furnished or decorated. More specifically, the arrangement item is a virtual object having a motif of a furniture article, a home appliance, an interior decoration article, etc. The game is executed such that the user obtains such an arrangement item in the game and arranges the item in (the predetermined area set as) the room of the player character, thereby enjoying decorating (customizing) the room. A process according to the exemplary embodiment relates to a process for decorating the room (hereinafter, referred to as "room editing process"), and in particular, a process related to changing wallpaper in the room.

Regarding a method for obtaining a virtual object, the user can obtain the virtual object by, for example, performing an event of "making furniture" in the game. Moreover, the user can increase the number of virtual objects he/she possesses by performing the event a plurality of numbers of times.

Figure 2:
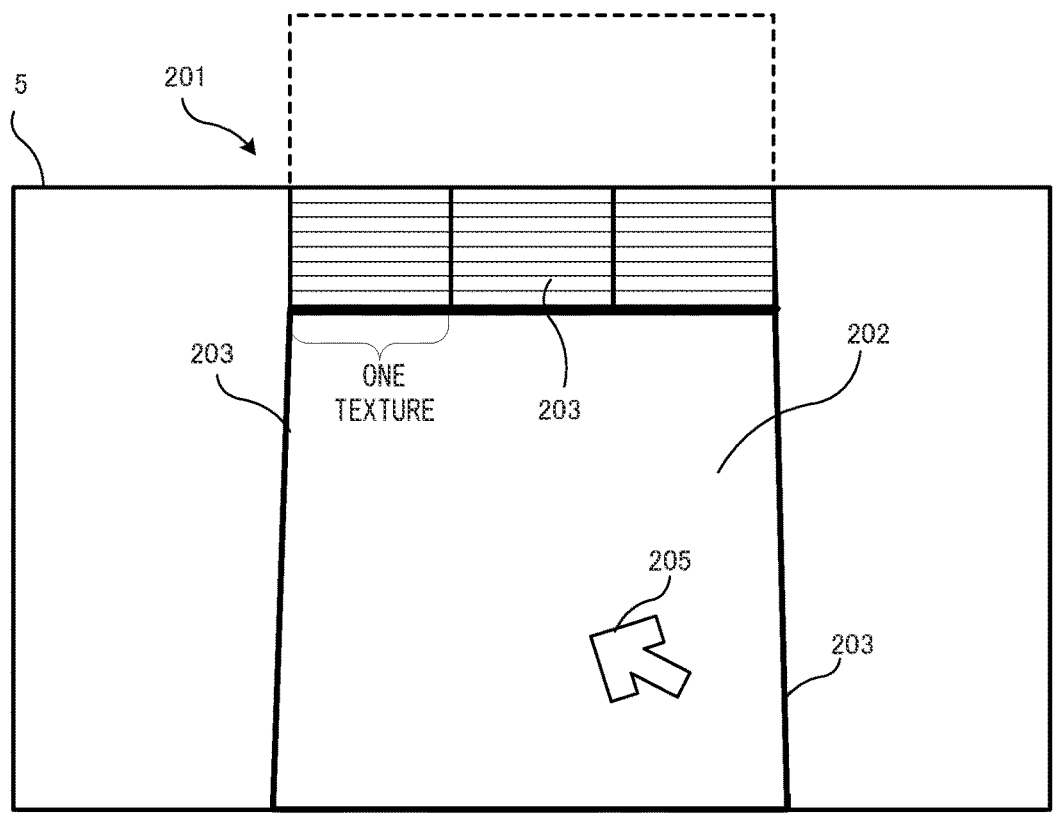
FIG. 2 shows a non-limiting example of a game screen.

Next, the outline of the game processing according to the exemplary embodiment will be described with reference to examples of screens. FIG. 2 shows an example of a screen immediately after the room editing process has been started. For convenience of description, a state where no arrangement item is arranged in a room of a player character is shown as an example of an initial state. In FIG. 2, a room 201 in the initial state is displayed. In the exemplary embodiment, the room 201 is a virtual space composed of a floor object 202, a plurality of wall objects 203, and a ceiling object (not shown). Regarding the wall objects 203, one wall object 203 is arranged along each of four sides of the floor object 202 having a rectangular shape, that is, four wall objects 203 in total are arranged. For convenience of description, each wall object 203 has a height of 2 m in terms of the size in the virtual game space. The wall object 203 arranged along the upper side of the floor object 202 has a width of 3 m in terms of the size in the virtual game space. FIG. 2 shows a game image obtained by capturing the room 201 with a virtual camera from a predetermined position. In FIG. 2, the wall object 203 on the near side as seen from the virtual camera is made to be transparent for ease of user operation. Moreover, in FIG. 2, regarding the wall object 203 arranged along the upper side of the floor object 202, only a substantially lower half part thereof appears in the screen. A part, of the wall object 203, which does not appear in the screen is indicated by a dotted line in FIG. 2 so that the entire image of the wall object 203 can be easily grasped. It is possible to make this part appear in the screen by changing the position and/or the angle of the virtual camera.

Although not shown in FIG. 2, each wall object 203 may have a window and/or a door.

In FIG. 2, a cursor 205 is also displayed. The user can designate an arrangement object (described later) arranged in the room 201 and designate various kinds of selection elements displayed on the screen by moving the cursor 205 through a predetermined operation.

In the exemplary embodiment, as wallpaper for each wall object 203, a two-dimensional image (hereinafter, referred to as "texture") having a predetermined size is pasted. In the exemplary embodiment, one texture is an image having a size of 1 m (width) by 2 m (height) in terms of the size in the virtual game space. In the example of FIG. 2, regarding the wall object 203 arranged along the upper side of the floor object 202, three identical textures are pasted side by side in the horizontal direction (in other words, the same texture is repeatedly pasted in the horizontal direction). Although not visible in FIG. 2, the same texture as described above is similarly pasted as wallpaper to each of the wall objects 203 arranged at the left, right, and lower sides of the floor object 202. Hereinafter, when the term "wallpaper" is simply used, this term refers to the "texture" to be pasted to the wall object 203.

Next, major operations that the user can perform in the room editing process will be described. In the exemplary embodiment, the user can perform two types of operations, i.e., "arrangement object arranging operation" and "wallpaper change operation".

[Arranging Operation]

Figure 3:
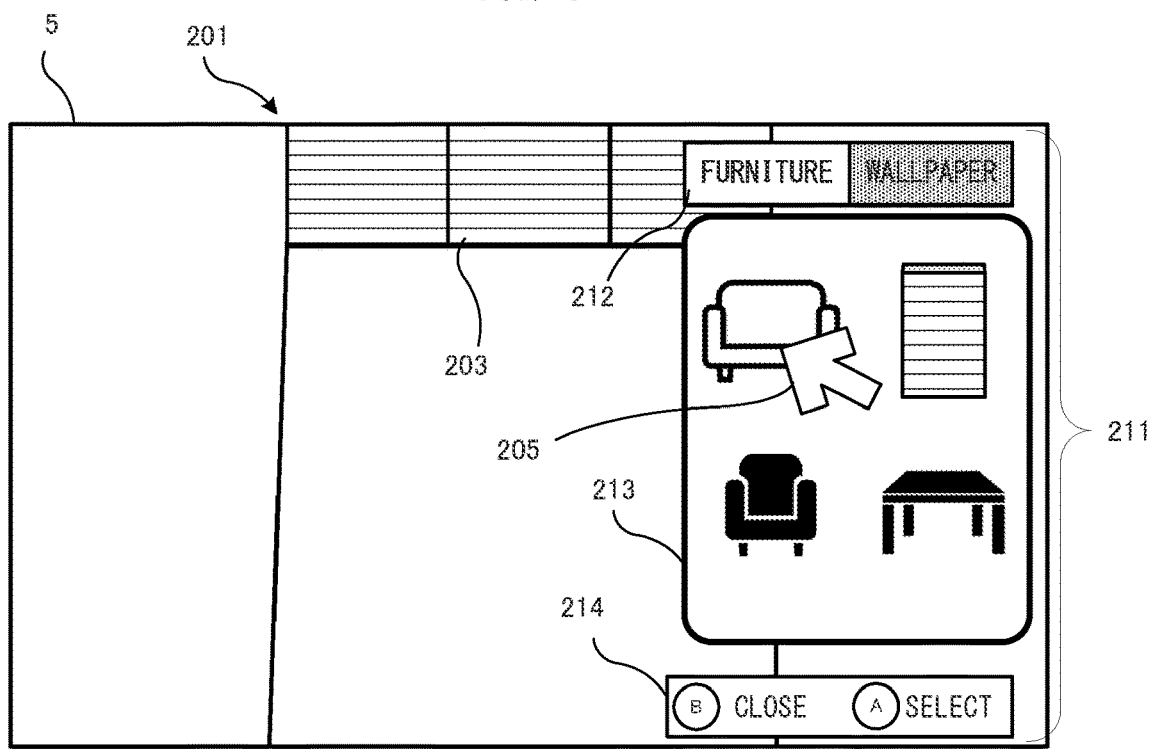
FIG. 3 shows a non-limiting example of a game screen.

First, an example of "arrangement object arranging operation" will be described. When the user has performed a predetermined operation in the state shown in FIG. 2, a list image 211 as shown in FIG. 3 is displayed. In FIG. 3, the list image 211 includes category tabs 212, a list window 213, and an operation guide 214. The category tabs 212 are tabs for switching between the categories of items to be displayed on the list window 213. In the exemplary embodiment, there are two categories, "furniture" and "wallpaper". In the initial state, "furniture" is selected. In another embodiment, tabs corresponding to categories into which the category of "furniture" is further classified, may be displayed. For example, tabs corresponding to categories such as "desk", "chair", "home appliance", etc., may be displayed.

Figure 4:
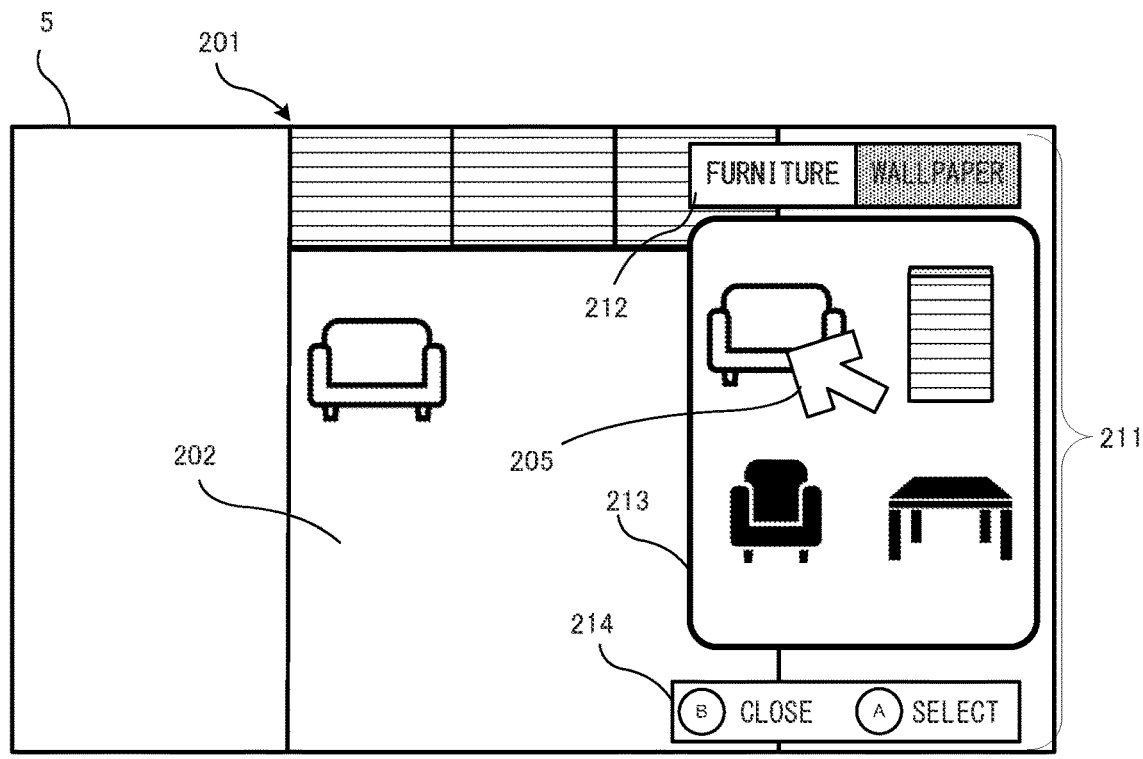
FIG. 4 shows a non-limiting example of a game screen.

The list window 213 is a display area scrollable by a drag operation. The display content of the list window 213 is changed according to the selection state of the category tabs 212. When the category tab 212 of "furniture" is being selected, a list of arrangement objects that the user possesses at that time is displayed. The user selects a predetermined arrangement object from the list window 213 by using the cursor 205, and presses a predetermined button which is an A button disposed on the controller 4 in this example, thereby deciding the arrangement object being selected, as an object to be arranged. The arrangement object decided as an object to be arranged is arranged at a predetermined position on the floor object 202 as shown in FIG. 4. The predetermined position may be automatically determined according to the arrangement status at that time, or may be designated by the user.

After the user has performed the arrangement object selecting and arranging operations as described above, the user can complete the arranging operation and delete the list image 211 by pressing a B button.

[Already-Arranged Object Change Operation]

Figure 5:
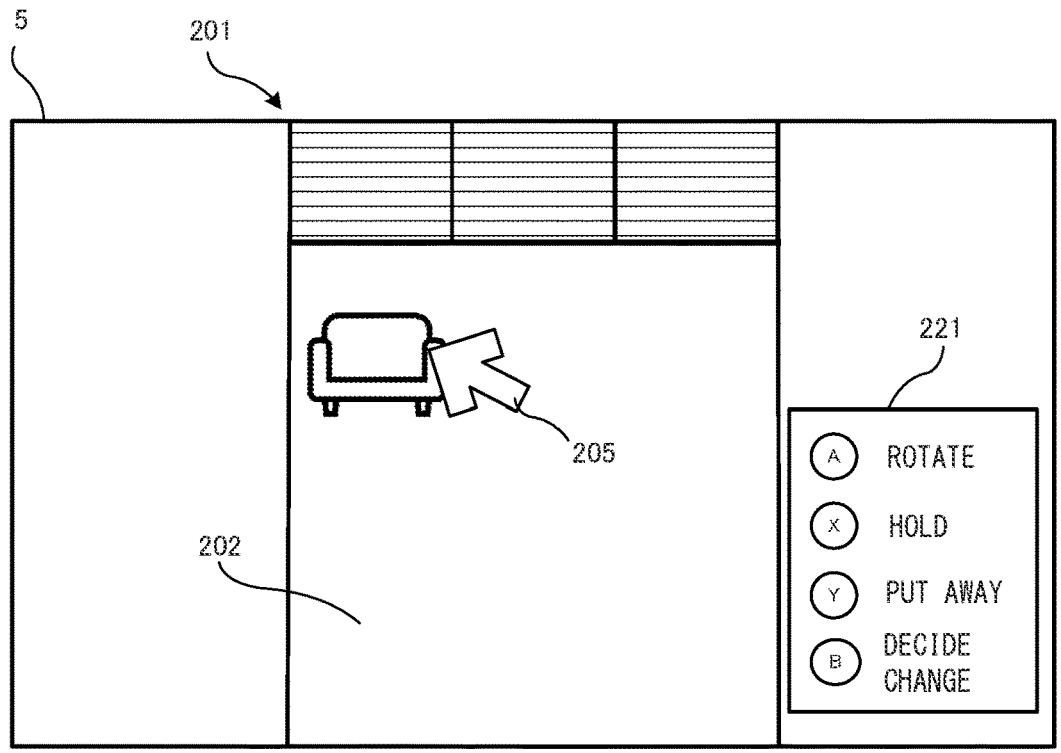
FIG. 5 shows a non-limiting example of a game screen.

After the list image 211 has been deleted, operations as follows can be further performed on the arrangement object arranged as described above. That is, the position of the arrangement object can be changed, and the arrangement object can be rotated (the orientation thereof can be changed). Moreover, the arrangement object can also be "put away". Specifically, when the user moves the cursor 205 to the already-arranged arrangement object and performs a predetermined operation, the arrangement object enters a currently selected state, and an arrangement editing operation guide 221 as shown in FIG. 5 is displayed. With reference to FIG. 5, each time the user presses the A button in the state shown in FIG. 5, the arrangement object is rotated at units of 90 degrees around an axis orthogonal to the floor object 202. Moreover, the user can change the arrangement position by performing a direction instruction input while pressing an X button. The user can decide the content of the rotation or the position change by pressing a B button. Moreover, the user can put away the arrangement object from the room 201 (so that the arrangement object is not arranged in the room 201) by pressing a Y button. In this case, the change is decided without the B button being pressed.

[Wallpaper Change Operation]

Figure 6:
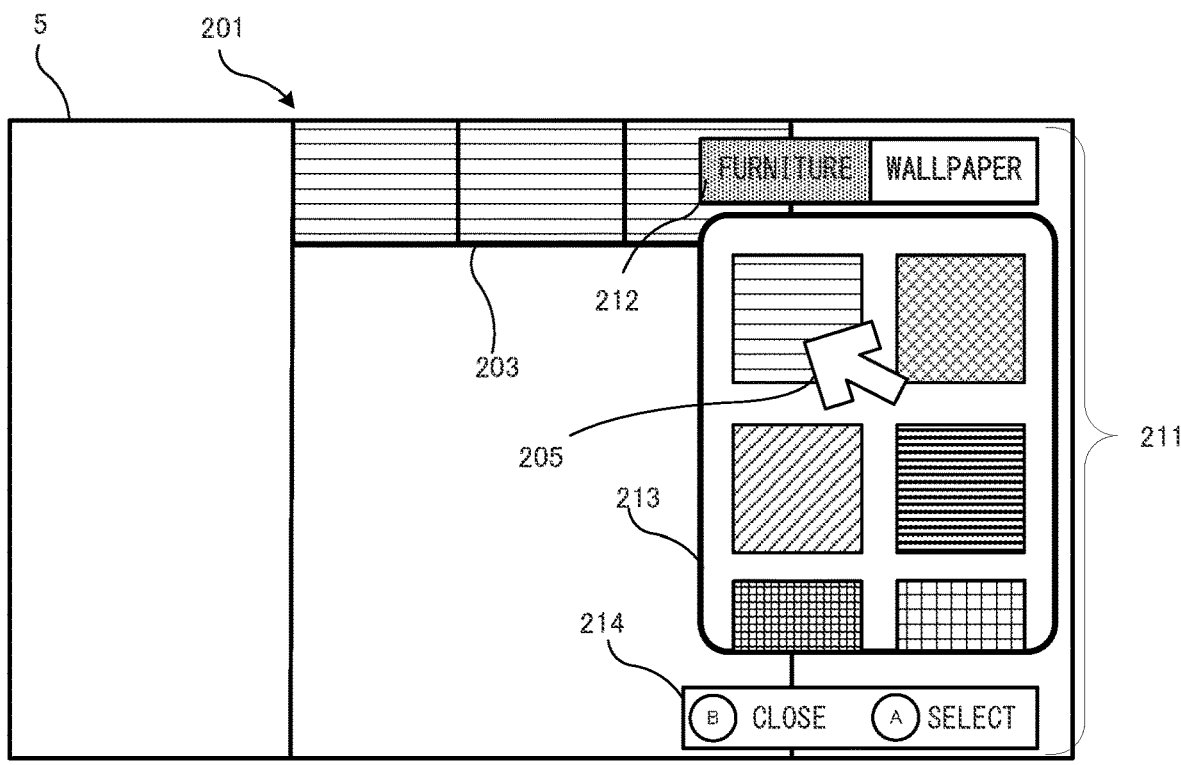
FIG. 6 shows a non-limiting example of a game screen.

Next, an example of "wallpaper change operation" will be described. When the user performs an operation of selecting "wallpaper" from the category tabs 212, the content of the list window 213 is switched to a list of wallpapers that the user possesses at that time, as shown in FIG. 6. Regarding the wallpaper, like the case of the arrangement objects, the user can increase the number of wallpapers he/she possesses by obtaining wallpaper through predetermined game processing.

Figure 7:
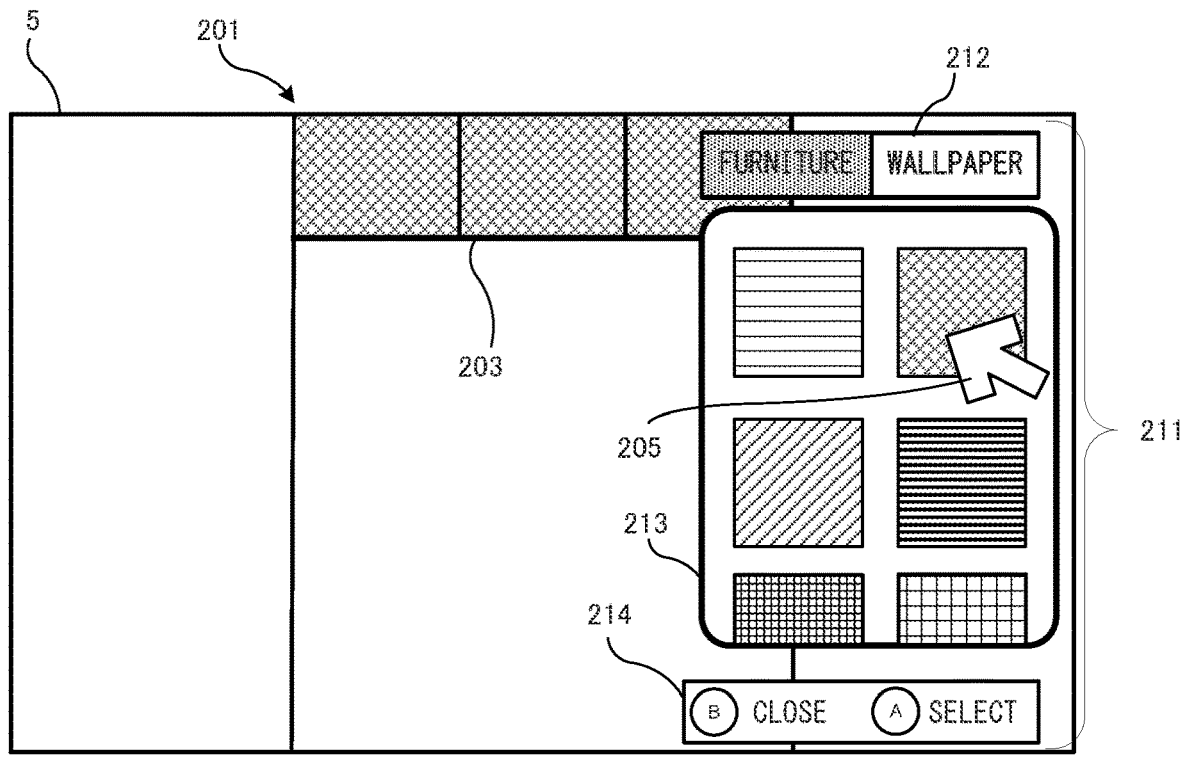
FIG. 7 shows a non-limiting example of a game screen.

In the state immediately after the user has switched the category tab 212 to "wallpaper", the cursor 205 is automatically positioned to the wallpaper that is set on the wall object 203 at that time. From this state, the user selects another wallpaper, e.g., a next wallpaper displayed on the right, and presses the A button, whereby the wallpaper set on the wall object 203 is changed to the selected wallpaper, as shown in FIG. 7. After the wallpaper has been changed, the list image 211 is deleted as described above when the user presses the B button.

[Partition Wall]

Figure 8:
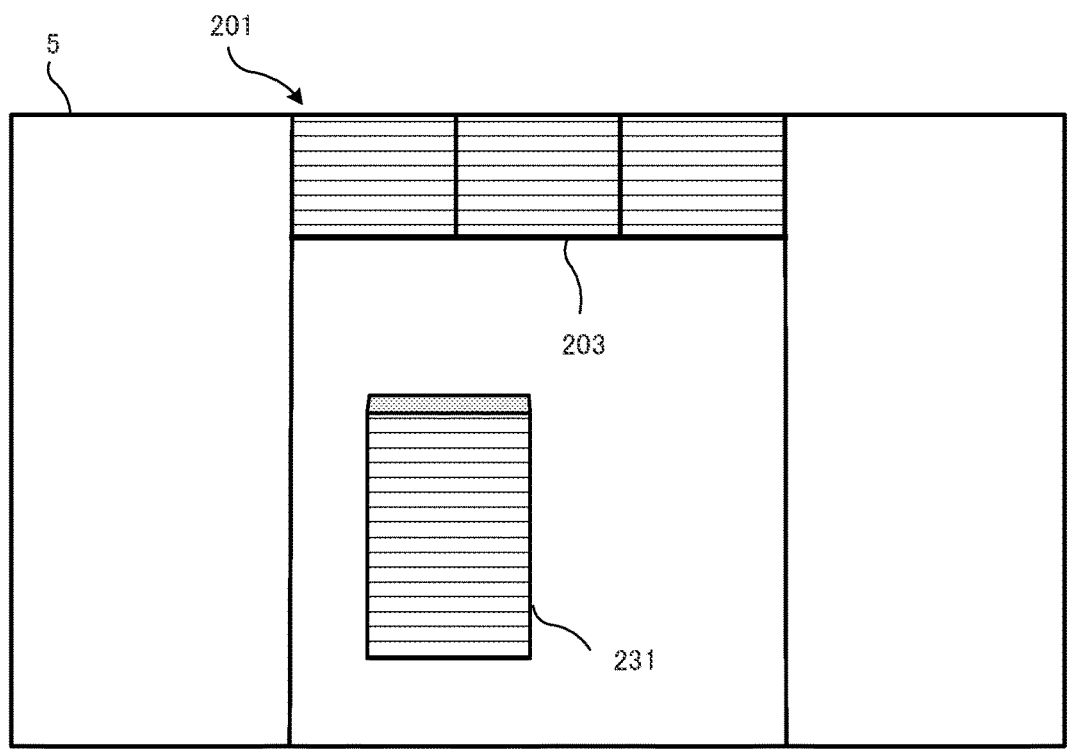
FIG. 8 shows a non-limiting example of a game screen.

Incidentally, in the exemplary embodiment, as one of the arrangement objects described above, "partition wall object" (hereinafter, referred to simply as "partition wall") is prepared. The partition wall is a plate-shaped object used for partitioning the inside of the room. FIG. 8 shows a game image in which one partition wall 231 is arranged through the aforementioned "arrangement object arranging operation". In the exemplary embodiment, the partition wall 231 is a plate-shaped rectangular parallelepiped object having main surfaces and side surfaces. The main surfaces are outward surfaces having the largest area. Since the partition wall 231 has a plate shape, the partition wall 231 has, as the main surfaces, two surfaces parallel to each other and facing outward from each other. Hereinafter, when the term "main surface" is simply used, this term includes the two surfaces.

In the exemplary embodiment, the main surface has a size of 1 m (width) by 2 m (height) in terms of the size in the virtual game space. That is, the main surface has a rectangular shape, and the size thereof is the same as the image size of one texture described above. This also means that the partition wall 231 is an object having the same height as the wall object 203. In the exemplary embodiment, the user can arrange a plurality of partition walls 231 described above, and can design a layout in which the inside of the room is partitioned by the partition walls 231 by appropriately performing position change and/or rotation (in units of 90 degrees) of the partition walls 231 as described above. For example, it is possible to change the layout of 1DK (1 room+dining and kitchen area) to the layout of 2DK (2 rooms+dining and kitchen area). In the exemplary embodiment, each arrangement object can be rotated in units of 90 degrees. Regarding the orientation of the partition wall 231, the partition wall 231 can be arranged such that the main surface thereof is horizontal or vertical with respect to the wall surface of the wall object 203.

Figure 9:
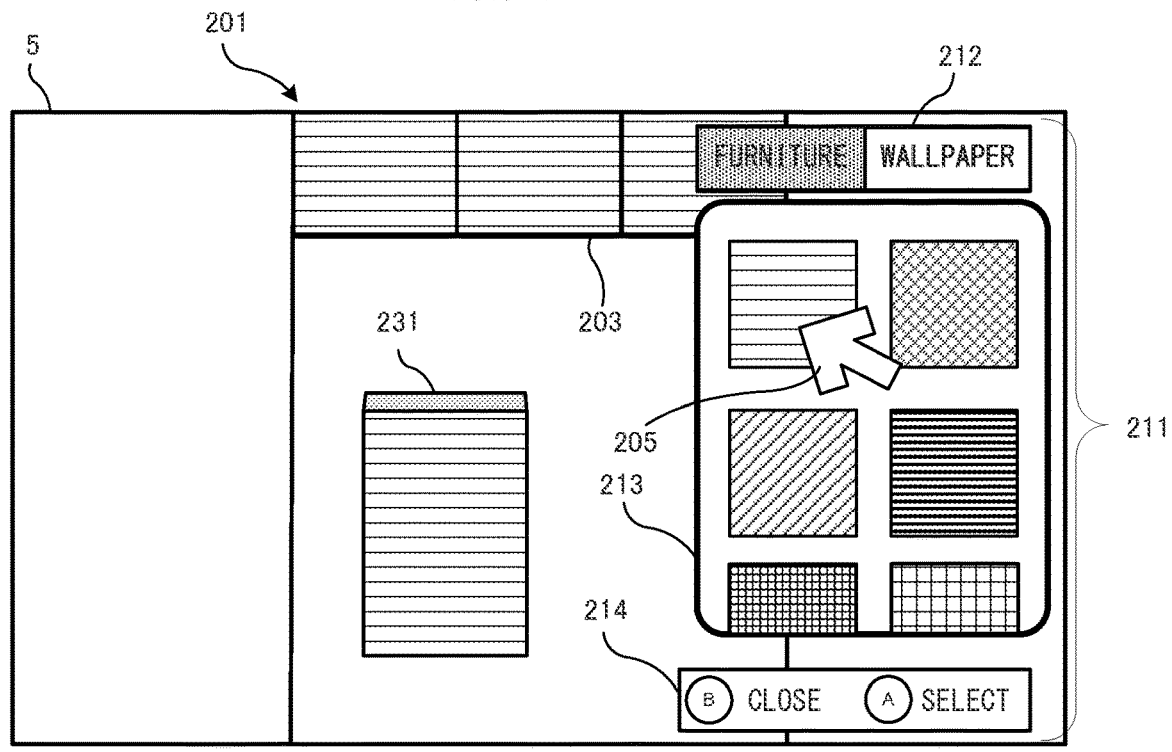
FIG. 9 shows a non-limiting example of a game screen.
Figure 10:
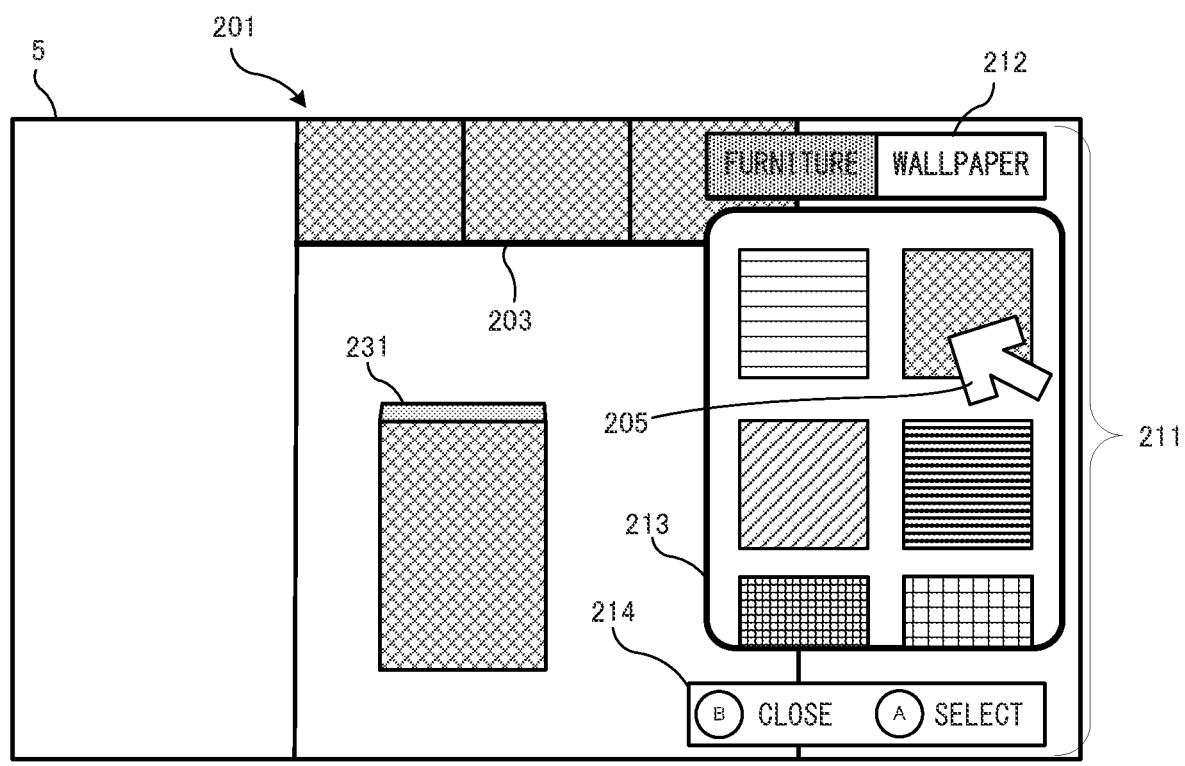
FIG. 10 shows a non-limiting example of a game screen.

In terms of decorating the room, it is also conceivable that a predetermined pattern image is set on the main surface of the partition wall 231. For example, it is conceivable that the user sets a predetermined pattern image for each of the plurality of partition walls 231. However, such an individual setting operation is considered to take time. Therefore, in the exemplary embodiment, regarding a pattern image used for the main surface of the partition wall 231 (hereinafter, the pattern image is referred to as "main surface image"), a process of setting a main surface image in accordance with the wallpaper set on the wall object 203 is performed. That is, in the exemplary embodiment, regarding the main surface image of the partition wall 231, a process of automatically using the same texture as (the texture of) the wallpaper set on the wall object 203 at that time is performed. In the example of FIG. 8, at the time of arranging the partition wall 231, the partition wall 231 having the main surface on which the same texture as the wallpaper of the wall object 203 is pasted, is arranged. It is assumed that, from this state, an operation of changing the wallpaper is performed. When the user performs a predetermined operation to display the list image 211 and selects the "wallpaper" tab, a game image as shown in FIG. 9 is displayed. In FIG. 9, as in FIG. 6, the cursor 205 is positioned on the wallpaper that is set on the wall object 203 at this time. From this state, the user selects, for example, a next wallpaper displayed on the right and presses the A button by operating the cursor 205. Then, as shown in FIG. 10, the wallpaper of the wall object 203 is changed and the main surface image of the already-arranged partition wall 231 is also changed to (the image of) the selected wallpaper. That is, in accordance with the change of the wallpaper, the main surface image of the partition wall 231 is also changed to the same texture as the wallpaper.

In the exemplary embodiment, a texture of a single-color image is pasted to the side surfaces (surfaces other than the main surface) of the partition wall 231. As to what color should be used as the single color, it is determined based on the main surface image. In the exemplary embodiment, the color of a pixel at a predetermined position in the main surface image is determined to be used as the color of the side surfaces. For example, the color of a pixel at any of the corners of the main surface may be used. Alternatively, pixels at a plurality of positions in the main surface are extracted, and a color that is most frequently used among the pixels may be selected as the single color for the side surfaces. In another embodiment, not only a single color but also a plurality of colors may be used for the side surfaces as long as the colors are determined based on the main surface image.

[Details of Room Editing Process According to Exemplary Embodiment]

Next, the room editing process according to the exemplary embodiment will be described in more detail with reference to FIG. 11 to FIG. 19.

[Data to be Used]

Figure 11:
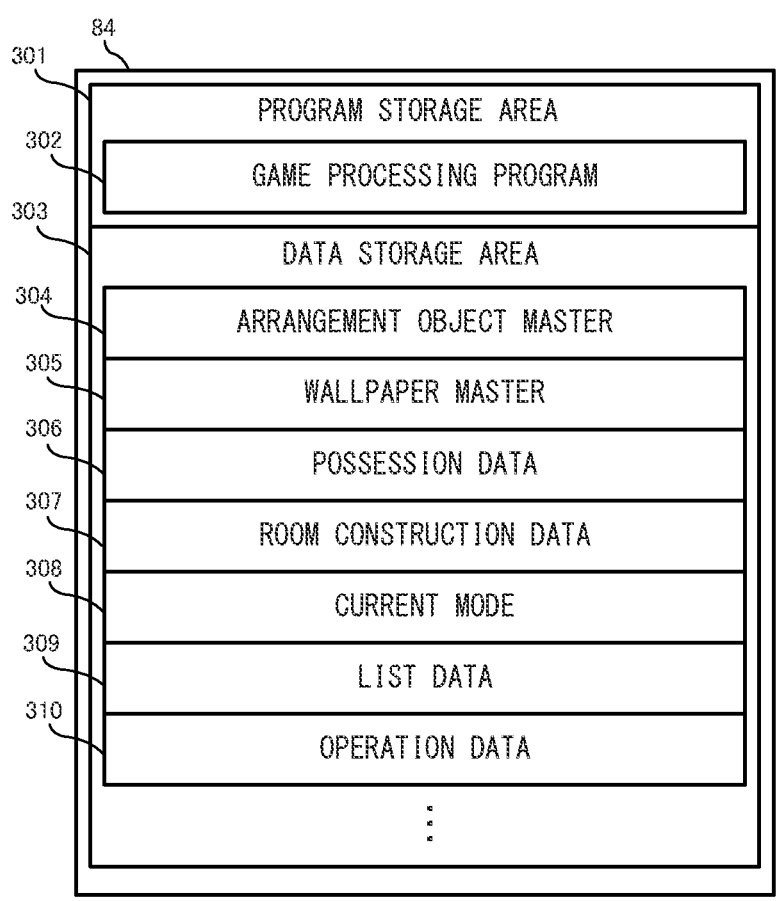
FIG. 11 is a memory map showing a non-limiting example of various kinds of data stored in a storage section 84.

First, various kinds of data to be used in this game processing will be described. FIG. 11 is a memory map showing an example of various kinds of data stored in the storage section 84 of the game apparatus 2. The storage section 84 includes a program storage area 301 and a data storage area 303. A game processing program 302 is stored in the program storage area 301. An arrangement object master 304, a wallpaper master 305, possession data 306, room construction data 307, a current mode 308, list data 309, operation data 310, and the like are stored in the data storage area 303.

The game processing program 302 is a program for executing the game processing according to the exemplary embodiment, and also includes a program code for executing the room editing process.

Figures 12, 13, 14:
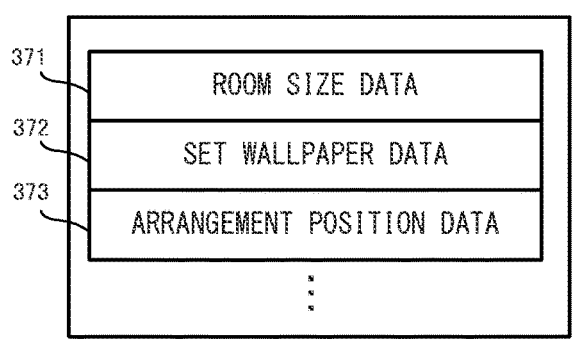
FIG. 12 shows a non-limiting example of a data structure of an arrangement object master 304.
FIG. 13 shows a non-limiting example of a data structure of a wallpaper master 305.
FIG. 14 shows a non-limiting example of a data structure of room construction data 307.

The arrangement object master 304 is data that defines all arrangement objects that appear in this game. FIG. 12 shows an example of the data structure of the arrangement object master 304. The arrangement object master 304 is a database including at least items such as an object ID 341, type data 342, model data 343, and object texture data 344.

The object ID 341 is an ID for uniquely identifying the corresponding arrangement object.

The type data 342 is data indicating the type of the corresponding arrangement object. Here, a supplemental description of the "type" will be given. In the exemplary embodiment, the arrangement objects are classified into "first-type objects" and "second-type objects" to be managed. In the exemplary embodiment, the first-type objects are the aforementioned partition walls 231. The second-type objects are the arrangement objects other than the partition walls 231. That is, the arrangement objects having factors linked with setting of wallpaper of the wall object 203 are classified as the first-type objects while the other arrangement objects are classified as the second-type objects.

The model data 343 is data that defines a 3D model (stereoscopic shape) of the corresponding arrangement object.

The object texture data 344 is data that is defined only for the corresponding second-type object and that defines a texture used as the appearance of the second-type object. As described above, since the appearance (main surface image) of the partition wall 231 as the first-type object can be set and changed in accordance with the wallpaper of the wall object 203, the first-type object does not have unique texture data. For example, the first-type object may be given a Null value as the object texture data 344. According to the above data structure, the appearance of each first-type object is rendered based on the setting of the wallpaper while the appearance of each second-type object is rendered by using the texture that is uniquely set on the second-type object.

Referring back to FIG. 11, the wallpaper master 305 is data that defines all the wallpapers that appear in this game. FIG. 13 shows an example of the data structure of the wallpaper master 305. The wallpaper master 305 is a database having at least items such as a wallpaper ID 351 and wallpaper texture data 352. The wallpaper ID 351 is an ID for uniquely identifying each wallpaper. The wallpaper texture data 352 is data of a two-dimensional image corresponding to each wallpaper. As described above, in the exemplary embodiment, this image is an image having a size of 1 m by 2 m in terms of the size in the virtual game space.

Referring back to FIG. 11, the possession data 306 is data indicating the arrangement objects and the wallpapers that the user possesses. In the possession data 306, object IDs 341 and wallpaper IDs 351 according to the possession status of the user are stored. If the user is allowed to possess a plurality of identical objects, the number of the objects may be stored in the possession data 306.

The room construction data 307 is data indicating the current content (layout, etc.) of the room 201. FIG. 14 shows an example of the data structure of the room construction data 307. The room construction data 307 includes at least room size data 371, set wallpaper data 372, and arrangement position data 373. The room size data 371 is data that defines the size of the room 201 (in a virtual three-dimensional space). For example, if the user is allowed to designate and change the size of the room 201 (according to the progress status of the game), the size designated by the user is stored. In the exemplary embodiment, a floor object 202 having a predetermined size is generated and arranged in accordance with the content designated in the room size data 371, and wall objects 203 and a ceiling object are generated and arranged in accordance with the floor object 202. Thus, (the framework of) the room 201 is constructed.

The set wallpaper data 372 is data that designates the wallpaper to be set (pasted) on the wall object 203. Moreover, as described above, in the exemplary embodiment, the set wallpaper data 372 also serves as data that designates the main surface image of the partition wall 231.

The arrangement position data 373 is data in which the arrangement positions and orientations of the arrangement objects (including both the first-type objects and the second-type objects) already arranged in the room 201, are stored. That is, the arrangement position data 373 is data in which the current content of the specific layout of the room 201 is stored. Specifically, the arrangement position data 373 includes the object IDs 341 of the arrangement objects being currently arranged, coordinate information indicating the arrangement positions, information indicating the arrangement orientations (e.g., rotation angles), and the like.

The room construction data 307 may include, in addition to the above data, information that designates textures used for the floor object 202 and the ceiling object, for example.

Referring back to FIG. 11, the current mode 308 is data indicating the current processing state in the room editing process. In the exemplary embodiment, the "processing state" in the room editing process is roughly classified into three "modes". The first mode is "list display mode" indicating a state where the list image 211 as shown in FIG. 3 or FIG. 6 is displayed. In this mode, the user is allowed to select an arrangement object to be arranged and set wallpaper, through the list window 213. The second mode is "arrangement change mode" indicating a state where an arrangement change operation is performed on an already-arranged arrangement object as shown in FIG. 5. In this mode, the user is allowed to move, rotate, and put away the already-arranged arrangement object. The third mode is "waiting mode" indicating a state other than the above states, that is, a state as shown in FIG. 2. In this mode, the user is allowed to perform an operation for shifting to the "list display mode" and an operation for shifting to the "arrangement change mode". In addition, the user is allowed to operate the virtual camera to change the angle at which the room 201 is captured. Moreover, the user is allowed to perform an instruction to end the room editing process.

The list data 309 is data that defines the content to be displayed on the list image 211, in particular, the list window 213. The list data 309 is generated based on the possession data 306. That is, the content displayed on the list window 213 includes only the arrangement objects and the wallpapers possessed by the user. The list data 309 has, stored therein, object IDs 341 and wallpaper IDs 351 of the objects to be displayed on the list window 213, information that defines the display order of the objects (the display positions of images of the arrangement objects in the list window 213), and the like. Moreover, the list data 309 also has, stored therein, information indicating the category to be currently displayed (hereinafter, referred to as "display category information") among the categories displayed as the category tabs 212 described above. In the exemplary embodiment, the categories are "furniture" and "wallpaper", and the default of the display category information is "furniture".

The operation data 310 is data indicating the contents of operations performed on the controller 4. In the exemplary embodiment, for example, the operation data 310 includes data indicating the operation states on the operation sections such as the analog stick and the buttons disposed on the controller 4. The contents of the operation data 310 are updated in a predetermined cycle on the basis of a signal from the controller 4.

In addition to the above, various kinds of data (e.g., sound data, etc.) to be used in the game processing are stored in the storage section 84 according to need.

[Details of Processes Executed by Processor 81]

Figure 15:
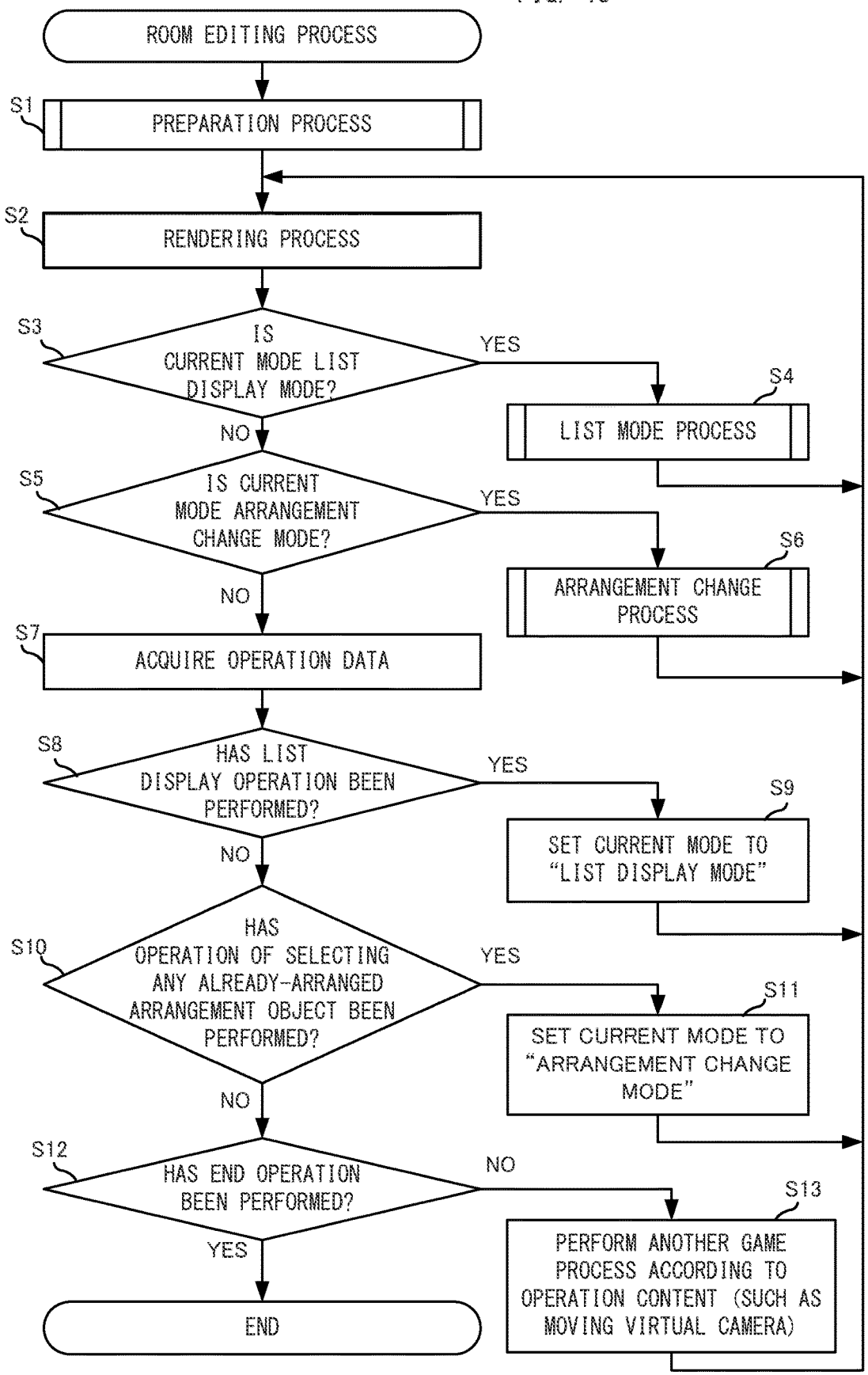
FIG. 15 is a non-limiting example of a flowchart showing a room editing process according to an embodiment in detail.

Next, the room editing process according to the exemplary embodiment will be described in detail. FIG. 15 is a flowchart showing the room editing process in detail. This process is started when an operation of editing the room 201 is performed from a game menu or the like, for example. A process loop of steps S2 to S13 shown in FIG. 15 is repeatedly executed for each frame.

The flowchart is merely an example of the processing procedure. Therefore, the order of process steps may be changed as long as the same result is obtained. In addition, the values of variables, and thresholds used in determination steps, are also mere examples, and other values may be employed according to need.

[Preparation Process]

Figure 16:
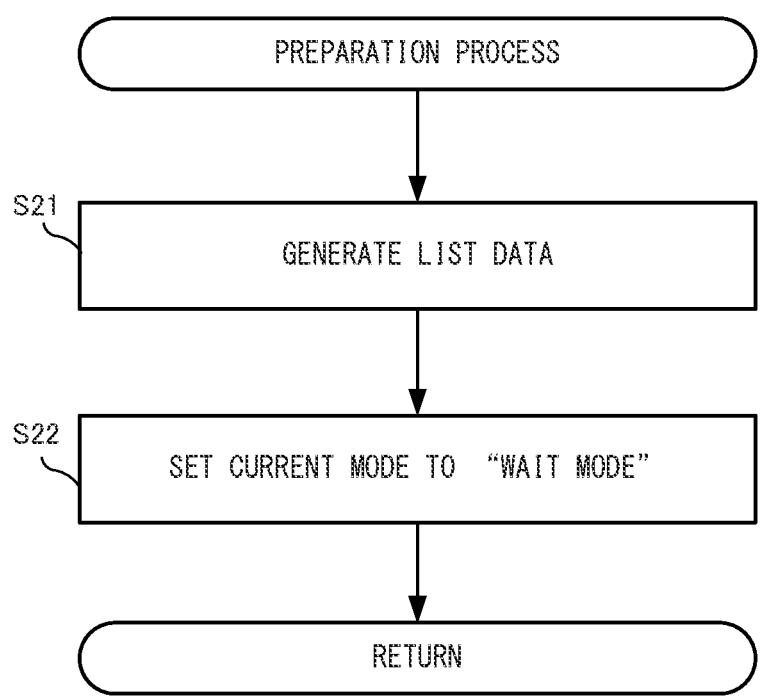
FIG. 16 is a non-limiting example of a flowchart showing a preparation process in detail.

With reference to FIG. 15, first, in step S1, the processor 81 executes a preparation process. FIG. 16 is a flowchart showing the preparation process in detail. In FIG. 16, first, in step S21, the processor 81 generates list data 309 as described above on the basis of the possession data 306 (at that time), and stores the list data 309 in the storage section 84.

Next, in step S22, the processor 81 sets "wait mode" in the current mode 308. This is the end of the preparation process.

[Rendering Process]

Referring back to FIG. 15, in step S2, the processor 81 executes a rendering process. Specifically, first, the processor 81 performs a process of constructing a room 201 in the virtual space on the basis of the room construction data 307. That is, the processor 81 generates a floor object 202 having a predetermined size on the basis of the room size data 371, and arranges it in the virtual space. The processor 81 also generates wall objects 203 and a ceiling object, and appropriately arranges them at predetermined positions based on the position of the floor object 202. Moreover, the processor 81 also performs a process of pasting the wallpaper designated by the set wallpaper data 372 to the wall objects 203. Next, the processor 81 arranges the arrangement objects designated by the arrangement position data 373 on the floor object 202 on the basis of the positions and orientations indicated by the arrangement position data 373. At this time, the processor 81 determines, based on the type data 342, whether each of the arrangement objects included in the arrangement position data 373 is a first-type object or a second-type object. Regarding the first-type object, i.e., the partition wall 231, the processor 81 performs a process of pasting the wallpaper designated by the set wallpaper data 372 to the partition wall 231, as a main surface image of the partition wall 231. Furthermore, the processor 81 determines a rendering color of the side walls of the partition wall 231 on the basis of some pixels in the main surface image as described above, and pastes a texture of a single-color image consisting of the determined color to the side walls. Meanwhile, regarding the second-type object, the processor 81 pastes a texture based on the object texture data 344 set on the corresponding arrangement object, to the arrangement object. After the room 201 has been constructed in the virtual space as described above, the processor 81 captures an image of the virtual space with the virtual camera. Furthermore, the processor 81 generates, according to need, a game image in which a predetermined image according to the current mode 308 (e.g., the list image 211 in the case of the list display mode) is synthesized with the image obtained by capturing the room 201 with the virtual camera, and outputs the game image to the display section 5.

[Determination of Current Mode]

Next, in step S3, the processor 81 determines whether or not the current mode 308 is the list display mode. When the current mode 308 is the list display mode (YES in step S3), the processor 81 executes a list mode process in step S4. The list mode process will be described later in detail.

When the current mode 308 is not the list display mode (NO in step S3), the processor 81 determines in step S5 whether or not the current mode 308 is the arrangement change mode. When the current mode 308 is the arrangement change mode (YES in step S5), the processor 81 executes an arrangement change process in step S6. The arrangement change process will be described later in detail.

[Determination on Presence/Absence of Mode Switch Operation]

When the current mode 308 is not the arrangement change mode (NO in step S5), the processor 81 acquires the operation data 310 in step S7. Next, in step S8, the processor 81 determines whether or not an operation for displaying the list image 211 (list display operation) has been performed. When the list display operation has been performed (YES in step S8), the processor 81 sets "list display mode" in the current mode 308 in step S9, and returns to step S2.

When the list display operation has not been performed (NO in step S8), the processor 81 determines in step S10 whether or not an operation of selecting any of the already-arranged arrangement objects has been performed. When the selecting operation has been performed (YES in step S10), the processor 81 sets "arrangement change mode" in the current mode 308 in step S11, and returns to step S2.

When the operation of selecting any already-arranged arrangement object has not been performed (NO in step S11), the processor 81 determines in step S12 whether or not an operation of ending the room editing process has been performed. When the ending operation has been performed (YES in step S12), the processor 81 ends the room editing process. When the ending operation has not been performed (NO in step S12), the processor 81 executes another game process according to an operation content in step S13. For example, a process of changing the position and/or the orientation of the virtual camera is executed according to the operation content.

[Process in List Display Mode]

Figure 17:
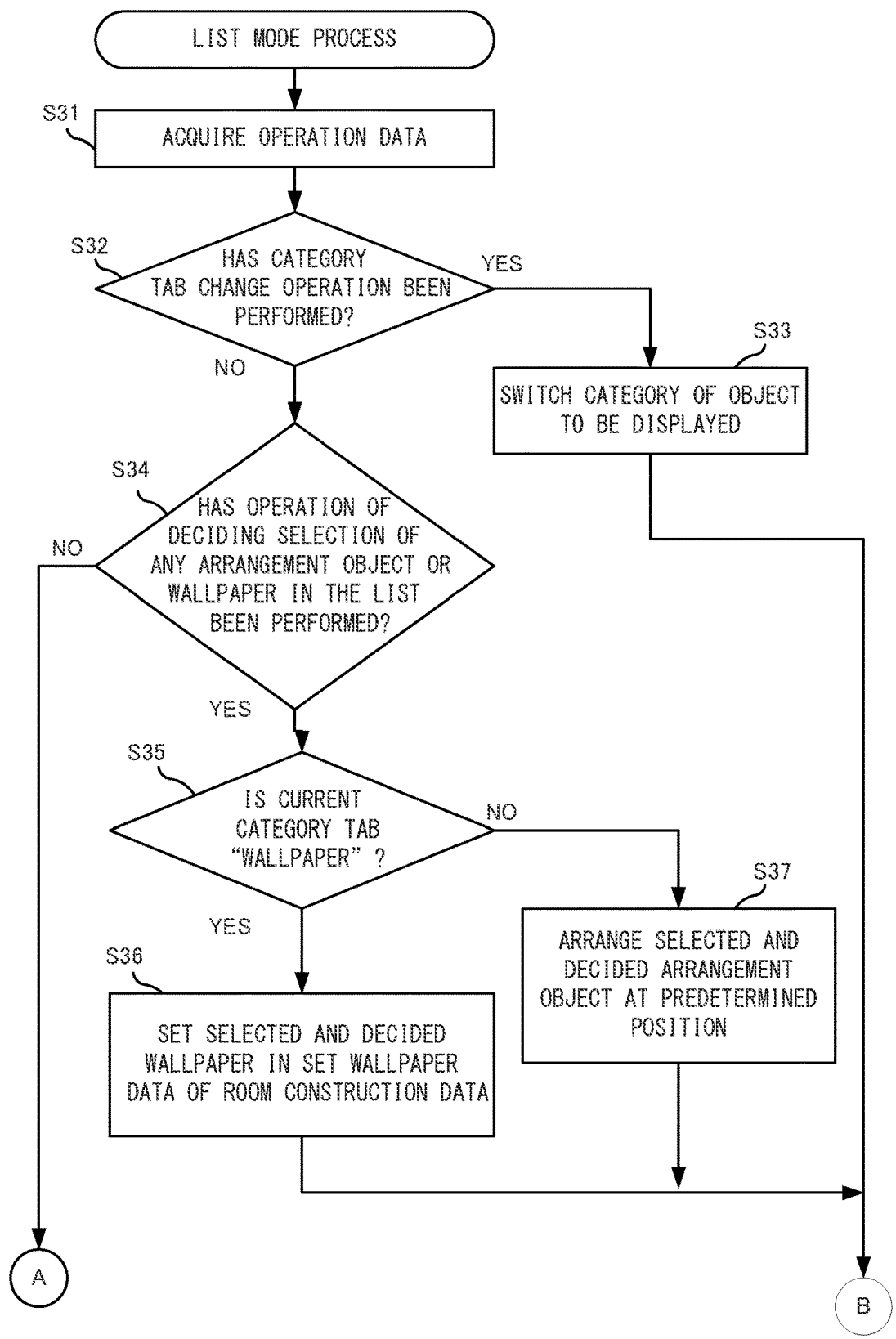
FIG. 17 is a non-limiting example of a flowchart showing a list mode process in detail.
Figure 18:
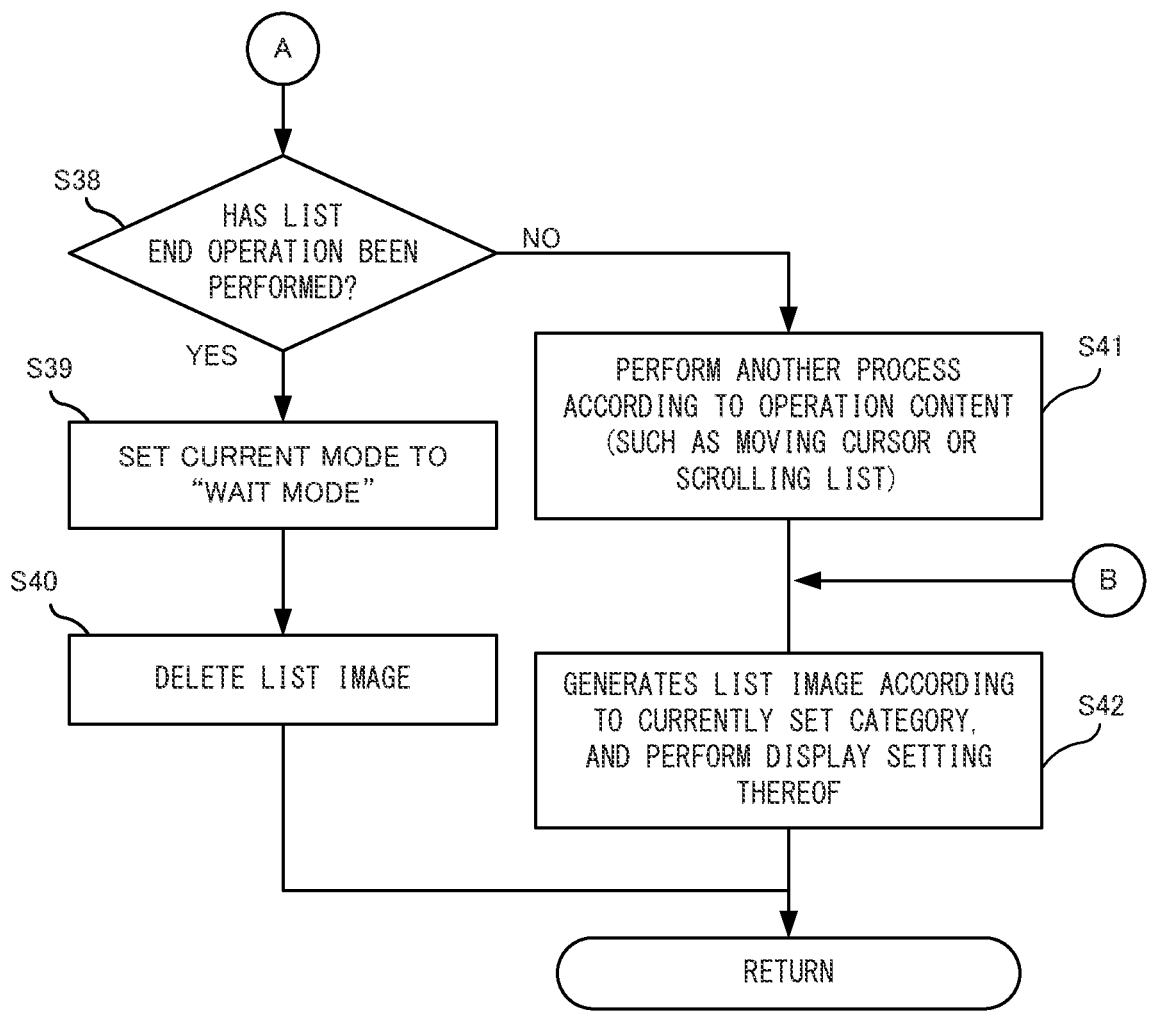
FIG. 18 is a non-limiting example of a flowchart showing a list mode process in detail.

Next, the list mode process in the above step S4 will be described. FIGS. 17 and 18 are flowcharts showing the list mode process in detail. First, in step S31, the processor 81 acquires the operation data 310. Next, in step S32, the processor 81 determines whether or not a display category change operation has been performed on the category tabs 212. When the display category change operation has been performed (YES in step S32), the processor 81 executes a process of switching between the categories of the category tabs 212 in step S33. Specifically, the processor 81 changes the content of the display category information included in the list data 309, according to the operation content. In this embodiment, the category is switched between "furniture" and "wallpaper". Thereafter, the process proceeds to step S42 described later.

Meanwhile, as a result of the determination in step S32, if the display category change operation has not been performed on the category tabs 212 (NO in step S32), the processor 81 determines in step S34 whether or not an operation of deciding selection of any selected item (arrangement object or wallpaper) in the list window 213 has been performed. In this embodiment, this operation is pressing the A button. When the selection deciding operation has been performed (YES in step S34), the processor 81 determines in step S35 whether or not the currently displayed category is "wallpaper". When a result of the determination is "wallpaper" (YES in step S35), this means that the selection deciding operation for any wallpaper has been performed. In this case, in step S36, the processor 81 sets the selected and decided wallpaper in the set wallpaper data 372 of the room construction data 307. If the rendering process as described above is performed later, the wall objects 203 and the partition wall 231 will be rendered by using the selected and decided wallpaper.

Meanwhile, when the currently displayed category is not "wallpaper" (NO in step S35), this means that the currently displayed category is "furniture" and the selection deciding operation has been performed on any arrangement object. In this case, in step S37, the processor 81 updates the content of the arrangement position data 373 such that the selected and decided arrangement object is arranged at a predetermined position on the floor object 202, with an orientation set as the default. Thus, if the rendering process is performed later, the room 201 in which the selected and decided arrangement object is arranged will be constructed and rendered. Thereafter, the process proceeds to step S42 described later.

Meanwhile, as a result of the determination in step S34, if the selection deciding operation has not been performed on any selected item in the list window 213 (NO in step S34), the processor 81 determines, in step S38 shown in FIG. 18, whether or not an operation for ending the list mode has been performed. As a result of the determination, if the ending operation has not been performed (NO in step S38), the processor 81 executes as appropriate another process according to an operation content in step S41. For example, a process of moving the cursor 205 (in the state where selection has yet to be decided), a process of scrolling the list window 213, or the like is executed.

Next, in step S42, the processor 81 generates a list image 211 according to the currently set category, and performs setting for displaying the list image 211 as a game image. For example, instruction setting for synthesizing the generated list image 211 with the image captured by the virtual camera, is performed. Thereafter, the list mode process is ended.

Meanwhile, as a result of the determination in step S38, if the ending operation has been performed (YES in step S38), the processor 81 sets "wait mode" in the current mode 308 in step S39. Next, in step S40, the processor 81 performs display setting for deleting the list image 211. Thereafter, the list mode process is ended. This is the end of the description of the list mode process.

[Arrangement Change Process]

Figure 19:
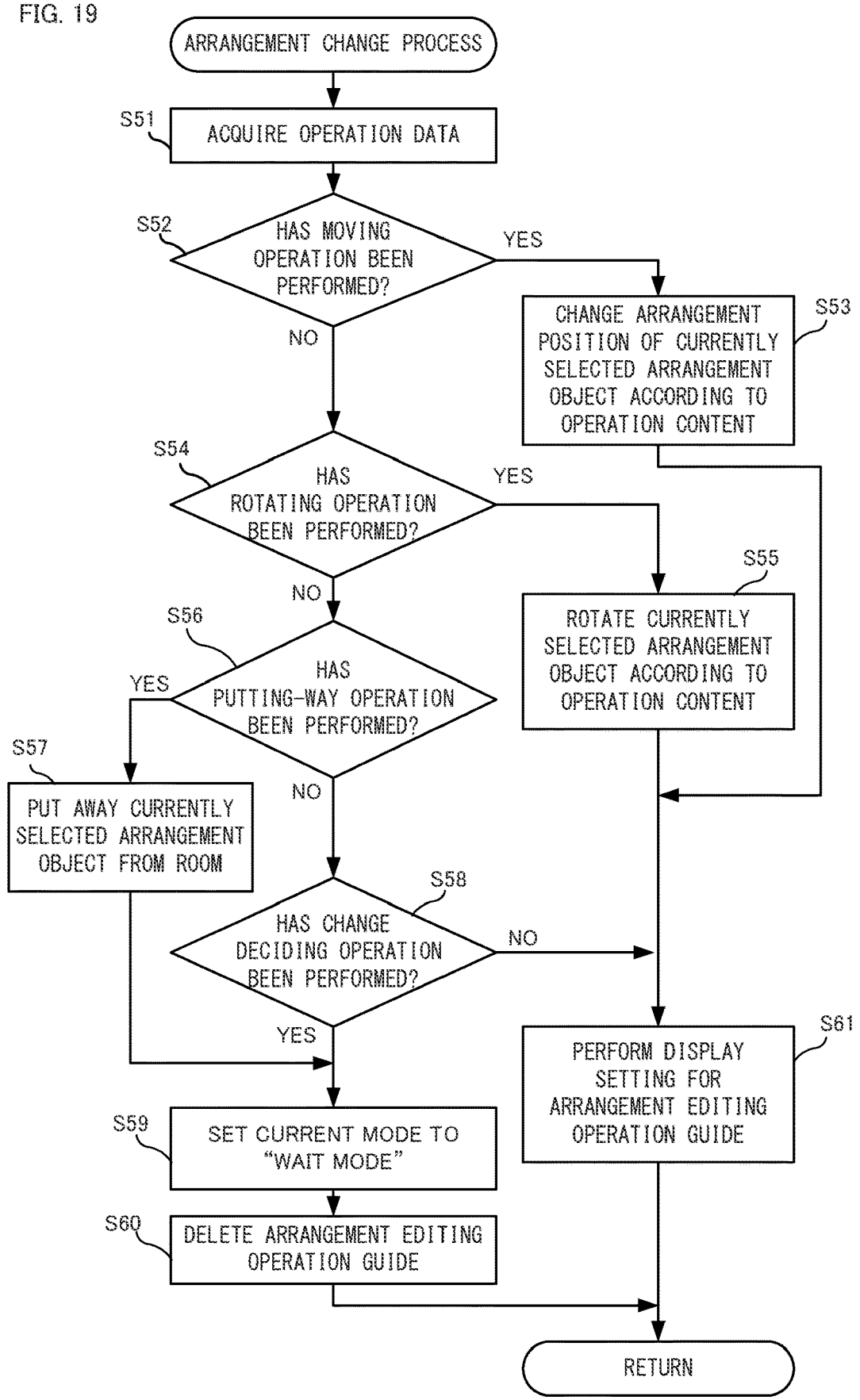
FIG. 19 is a non-limiting example of a flowchart showing an arrangement change process in detail.

Next, the arrangement change process in the above step S6 will be described in detail. FIG. 19 is a flowchart showing the arrangement change process in detail. First, in step SM, the processor 81 acquires the operation data 310. Next, in step S52, the processor 81 determines whether or not an operation of moving an arrangement object (changing the arrangement position) has been performed. When the moving operation has been performed (YES in step S52), the processor 81 performs, in step S53, a process of changing the arrangement position of the currently selected arrangement object, according to the operation content. That is, the processor 81 appropriately updates the content of the arrangement position data 373 (the arrangement position of the currently selected arrangement object) on the basis of the operation content. Thereafter, the process proceeds to step S61 described later.

Meanwhile, as a result of the determination in step S52, if the moving operation has not been performed (NO in step S52), the processor 81 determines in step S54 whether or not an operation of rotating the orientation of the currently selected arrangement object has been performed. As a result of the determination, if the rotating operation has been performed (YES in step S54), the processor 81 executes, in step S55, a process of rotating the currently selected arrangement object by 90 degrees in a predetermined direction, according to the operation content. That is, the processor 81 appropriately updates the content of the arrangement position data 373 (the orientation of the currently selected arrangement object) on the basis of the operation content. Thereafter, the process proceeds to step S61 described later.

Meanwhile, as a result of the determination in step S54, if the rotating operation has not been performed (NO in step S54), the processor 81 determines in step S56 whether or not an operation of putting away the currently selected arrangement object has been performed. As a result of the determination, if the operation of putting away the arrangement object has been performed (YES in step S56), the processor 81 executes, in step S57, a process of putting away the currently selected arrangement object from the room 201. Specifically, the processor 81 deletes, from the arrangement position data 373, data of the arrangement object to be put away, thereby putting away the currently selected arrangement object from the room 201. Thereafter, the process proceeds to step S59 described later.

Meanwhile, as a result of the determination in step S56, if the operation of putting away the arrangement object has not been performed (NO in step S56), the processor 81 determines in step S58 whether or not an operation of deciding the change regarding movement or rotation has been performed. When the operation of deciding the change has been performed (YES in step S58), the processor 81 sets "wait mode" in the current mode 308 in step S59. In the subsequent step S60, the processor 81 deletes the arrangement editing operation guide 221 from the screen. Thereafter, the arrangement change process is ended.

Meanwhile, as a result of the determination in step S58, if the operation of deciding the change has not been performed (NO in step S58), the processor 81 generates an image of the arrangement editing operation guide 221 in step S61. Then, the processor 81 performs display setting so as to display the arrangement editing operation guide 221 on the screen. For example, instruction setting of synthesizing the generated image of the arrangement editing operation guide 221 with the image captured by the virtual camera, is performed. Thereafter, the arrangement change process is ended.

This is the end of the detailed description of the room editing process according to the exemplary embodiment.

As described above, in the exemplary embodiment, setting of the wallpaper of the wall object 203 and setting of the main surface image of the partition wall 231 are linked with each other. This allows the user to perform editing of a room having a sense of unity with respect to the atmosphere, through a simple operation. In particular, while it is considered that changing the wallpaper has great effect on the atmosphere of the room, it is possible to unify the overall atmosphere of the room when the same pattern as the wallpaper is used for the partition wall 231. According to the process of the exemplary embodiment, it is possible to simplify the operation of providing the atmosphere of the room with a sense of unity, thereby improving convenience of the user. Moreover, the user can select various types of wallpapers one after another by pressing the A button with the wallpaper list window 213 being opened. Thus, the user can visually recognize the atmosphere of the room in which the wallpaper is quickly changed, while having the impression of zapping TV channels. Thus, convenience of the user can be improved.

[Modifications]

In the above exemplary embodiment, regarding setting of wallpaper, common data (set wallpaper data 372) is used for both the wall object 203 and the partition wall 231. However, in another embodiment, the wall object 203 and the partition wall 231 may be provided with individual pieces of data for designating wallpaper. In this case, the respective pieces of data may designate the same wallpaper according to the wallpaper change operation.

In the above exemplary embodiment, a two-dimensional image, which is a still picture image, is used as the texture for wallpaper. However, an animation texture (so-called "moving wallpaper") may be used as the texture for wallpaper. The aforementioned processes can also be applied to the "moving wallpaper". That is, two types of wallpapers, the "still picture wallpaper" and the "moving wallpaper", may be used (so as to be selectable by the user). When the user selects the "moving wallpaper", the selected "moving wallpaper" is set on both the wall object 203 and the main surface image of the partition wall 231. In this case, regarding the reproduction speed of the animation of the "moving wallpaper", the same reproduction speed may be set for both the wall object 203 and the partition wall 231.

In the above "moving wallpaper", an image, which is temporarily displayed in a random position at a random timing, may be used. In this case, an area including the wall surfaces of the wall objects 203 and the main surface of the partition wall 231 may be used as a target area on which the random position is to be set. For example, it is supposed that, in "moving wallpaper" representing "thunderstorm", an image of "lighting" is temporarily displayed in a random position at a random timing. When determining the display position of the "lighting", the wall surfaces of the wall objects 203 and the main surface of the partition wall 231 may be combined to be one area and the display position may be determined within this area, instead of determining the display position only within the wall surfaces of the wall objects 203 or the main surface of the partition wall 231.

Figure 20:
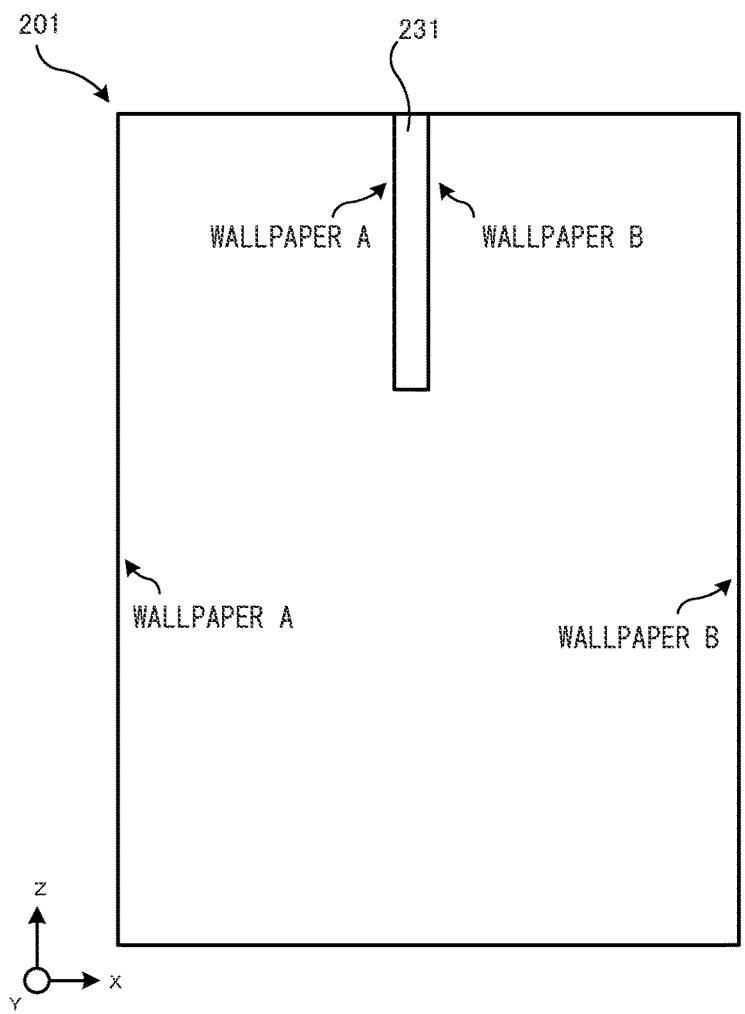
FIG. 20 is a non-limiting example of a diagram for describing a modification.
Figure 21:
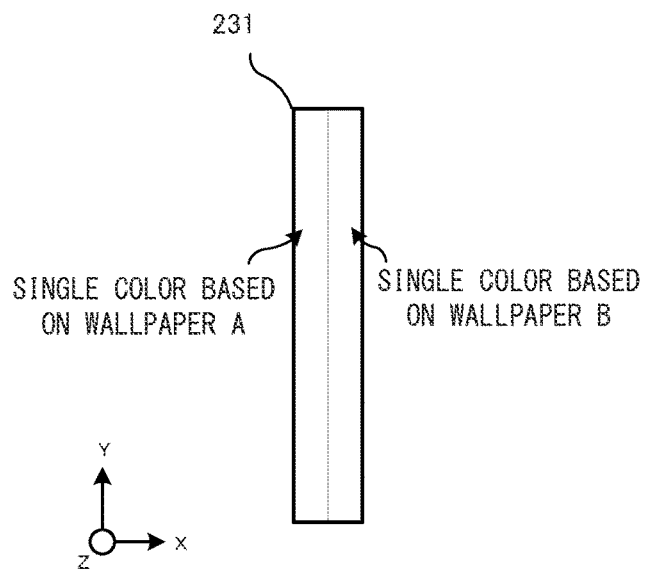
FIG. 21 is a non-limiting example of a diagram for describing a modification.

In the above exemplary embodiment, the same wallpaper is set on all the wall objects 203. In another embodiment, for example, different types of wallpapers may be set on the wall objects 203 arranged at the respective sides of the room 201. For example, different types of wallpapers may be set on the right-side wall object 203 (right wall) and the left-side wall object 203 (left wall) of the room 201. In this case, also regarding the main surface image of the partition wall 231, different wallpaper images may be used for one surface and the other surface of the main surfaces of the partition wall 231. For example, FIG. 20 schematically shows the room 201 viewed from above. It is assumed that "wallpaper A" and "wallpaper B" are set on the left wall and the right wall of the room 201, respectively. It is assumed that the partition wall 231 is arranged at an orientation such that the main surfaces thereof are respectively parallel to the left and right walls of the room 201. In this case, regarding wallpaper to be used for each of the main surface images of the partition wall 231, the wallpaper of the wall object 203 to which the main surface is opposed, may be used. In the example of FIG. 20, the "wallpaper A" may be used for the main surface, of the partition wall 231, opposing the left wall while the "wallpaper B" may be used for the main surface, of the partition wall 231, opposing the right wall. In this case, the color of the side surface of the partition wall 231 may be determined on the basis of a pixel in one of the main surfaces of the partition wall 231. Moreover, the side surface may be divided into two areas, i.e., left and right areas (see FIG. 21), and the color of the left area may be determined based on a color used in the "wallpaper A" while the color of the right area may be determined based on a color used in the "wallpaper B".

In the above exemplary embodiment, a case where the series of processes related to the room editing process are performed in a single game apparatus 2 has been described. However, in another embodiment, the series of processes above may be performed in an information processing system that includes a plurality of information processing apparatuses. For example, in an information processing system that includes a terminal side apparatus and a server side apparatus capable of communicating with the terminal side apparatus via a network, a part of the series of processes above may be performed by the server side apparatus. Alternatively, in an information processing system that includes a terminal side apparatus and a server side apparatus capable of communicating with the terminal side apparatus via a network, a main process of the series of processes above may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the game apparatus 2 may be configured to send operation data indicating a user's operation to a predetermined server, and the server may be configured to execute various types of game processing and stream the execution results as video/audio to the game apparatus 2.

While the exemplary embodiment has been described in detail, the foregoing description is in all aspects illustrative and not restrictive. It is to be understood that numerous other modifications and variations can be devised without departing from the scope of the exemplary embodiments.

What is claimed is:

1. A computer-readable non-transitory storage medium having stored therein a game program causing a computer of an information processing apparatus to perform operations comprising:
    processing operation data on the basis of an operation input;
    positioning a wall object in a room in a virtual space;
    selecting, based on the operation data, an object from among a plurality of objects including a first-type object and a second-type object, and arranging, moving, or deleting the selected object in the room;
    selecting, based on the operation data, a wallpaper to be set on the wall object; and generating an image of the virtual space that includes the wall object, the first-type object, and the second-type object by executing, for a given frame, a render process that includes:
  selecting, based on the wallpaper that has been selected using the operation data, a wallpaper texture and texture mapping the wallpaper texture to the wall object,
  automatically selecting, based on the wallp as been set, an object texture that corresponds to the wallpaper texture, and texture mapping the object texture to the first-type object that is arranged in the room in the virtual space, and
  texture mapping a texture that is different from the wallpaper that has been set to the second-type object that is arranged in the room in the virtual space.

2. The storage medium according to claim 1, wherein arranging moving, or deleting the selected object on a floor object constructing a floor of the room.

3. The storage medium according to claim 1, wherein the first-type object has a main surface, and
the main surface of the first-type object is rendered by using the object texture corresponding to the wallpaper texture.

4. The storage medium according to claim 3, wherein the main surface of the first-type object has a rectangular shape.

5. The storage medium according to claim 3, wherein the wall object is positioned
  such that at least one of main surfaces of the wall object is along a first direction in the virtual space, and
  the first-type object is arranged or moved such that the main surface of the first-type object is along the first direction or a second direction perpendicular to the first direction.

6. The storage medium according to claim 3, wherein the render process includes
  using a plurality of instances of the wallpaper texture arranged side by side on a wall surface of the wall object.

7. The storage medium according to claim 1, wherein the first-type object has a height, in the virtual space, which is equal to a height of the wall object.

8. The storage medium according to claim 1, wherein the first-type object has two main surfaces that are parallel to each other and facing outward from each other, and
  the two main surfaces are rendered by using the object texture that corresponds to the set wallpaper.

9. The storage medium according to claim 1, wherein the operations further comprise:
  calculating a color based on a color of any pixel in the wallpaper texture used for a main surface of the first-type object, and
  rendering a side surface, of the first-type object, which is different from the main surface of the first-type object, by using an image that includes the calculated color.

10. The storage medium according to claim 1, wherein the operations further comprise
  two types of wallpapers including a still-picture wallpaper and an animation wallpaper, wherein the selection of the wallpaper to be set on the wall object is based on one of the two types of presented wallpapers;
  wherein the animation includes an image that is temporarily displayed at a predetermined timing, and
  as part of the render process when the animation wallpaper has been selected, obtaining a display target based on a main surface of the wall object and a main surface of the first-type object; and
  determining a position in the display target area as a display position of the image that is temporarily displayed.

11. A game system comprising:
a user input device; and
a game apparatus that includes at least one processor being configured to execute:
  process operation data from the operation section;
  position a wall object of a room in a virtual space;
  select, based on the operation data, an object from among a plurality of objects including a first-type object and a second-type object, and arranging, moving, or deleting the selected object in the room;
  select . . . based on the operation data, a wallpaper to be set on the wall object;
  generate an image of the virtual space that includes the wall object, the first-type object, and the second-type object by executing, for a given frame, a render process that includes:
    selection, based on the wallpaper that has been selected using the operation data, of a wallpaper texture and texture mapping the wallpaper texture to the wall object,
    automatic selection, based on the wallpaper that has been set, of an object texture that corresponds to the wallpaper texture, and texture mapping the object texture to the first-type object that is arranged in the room in the virtual space, and
    texture map of a texture that is different from the wallpaper that has been set to the second-type object that is arranged in the room in the virtual space.

12. A game apparatus comprising:
at least one hardware processor and a memory coupled thereto, the hardware processor configured to perform operations comprising:
  processing operation data on the basis of an operation input;
  positioning a wall object in a room in a virtual space;
  selecting, based on the operation data, an object from among a plurality of objects including a first-type object and a second-type object, and arranging, moving, or deleting the selected object in the room;
  selecting, based on the operation data, a wallpaper to be set on the wall object; and
  generating an image of the virtual space that includes the wall object, the first- type object, and the second-type object by executing, for a given frame, a render process that includes:
    selecting, based on the wallpaper that has been selected using the operation data, a wallpaper texture and texture mapping the wallpaper texture to the wall object,
    automatically selecting, based on the wallpaper that has been set, an object texture that corresponds to the wallpaper texture, and texture mapping the object texture to the first-type object that is arranged in the room in the virtual space, and
    texture mapping a texture that is different from the wallpaper that has been set to the second-tyr object that is arranged in the room in the virtual space.

13. A game processing method comprising;
processing operation data on the basis of an operation input;
positioning a wall object in a room in a virtual space;

selecting, based on the operation data, an object from among a plurality of objects including a first-type object and a second-type object, and arranging, moving, or deleting the selected object in the room;

selecting, based on the operation data, a wallpaper to be set on the wall object; and generating an image of the virtual space that includes the wall object, the first-type obiect, and the second-type object by executing, for a given frame, a render process that includes:

selecting, based on the wallpaper that has been selected using the operation data, a wallpaper texture and texture mapping the wallpaper texture to the wall object, automatically selecting, based on the wallpaper that has been set, an object texture that corresponds to the wallpaper texture, and texture mapping the object texture to the first-type object that is arranged in the room in the virtual space, and texture mapping a texture that is not based on the wallpaper that has been set to the second-type object that is arranged in the room in the virtual space.

14. The storage medium of claim 1, wherein the object texture and the wallpaper texture are based on common texture data.

15. The storage medium of claim 1, wherein the object texture and the wallpaper texture are based on different pieces of texture data.

16. The storage medium of claim 1, wherein the wallpaper texture and the object texture are both an animated texture.

17. The storage medium of claim 16, wherein the operations further comprise:

determining a target display area that is based on a combining at least a main surface of the wall object and a main surface of the first-type object; and determining, within the target display area, a position at which an image for the animated texture is to be displayed.

18. The storage medium of claim 17, wherein the position at which the image for the animated texture is randomized over multiple different instances.

19. The storage medium of claim 17, wherein a timing at which the image for the animated texture is displayed is randomized over multiple different instances.

* * * * *